United States Patent
Hochstetler et al.

(10) Patent No.: US 10,612,640 B2
(45) Date of Patent: Apr. 7, 2020

(54) OUTPUT RING GEAR FOR INTEGRATED DRIVE GENERATOR

(71) Applicant: HAMILTON SUNDSTRAND CORPORATION, Charlotte, NC (US)

(72) Inventors: Derek R. Hochstetler, Rockford, IL (US); Ted A. Martin, Byron, IL (US); Duane C. Johnson, Beloit, WI (US); Glenn C. Lemmers, Jr., Loves Park, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 57 days.

(21) Appl. No.: 15/850,154

(22) Filed: Dec. 21, 2017

(65) Prior Publication Data
US 2019/0195330 A1    Jun. 27, 2019

(51) Int. Cl.
| | |
|---|---|
| F16H 55/17 | (2006.01) |
| F16H 55/08 | (2006.01) |
| F16H 48/10 | (2012.01) |
| F02C 7/32 | (2006.01) |
| F16H 48/38 | (2012.01) |

(52) U.S. Cl.
CPC .......... F16H 55/0806 (2013.01); F02C 7/32 (2013.01); F16H 48/10 (2013.01); F16H 55/17 (2013.01); *F05D 2220/764* (2013.01); *F05D 2260/406* (2013.01); *F05D 2260/40311* (2013.01); *F05D 2270/024* (2013.01); *F16H 2048/385* (2013.01); *F16H 2055/176* (2013.01)

(58) Field of Classification Search
CPC .......... F16H 55/08; F16H 48/10; F16H 55/17; F16H 2055/176; F16H 2048/385; F02C 7/32; F05D 2270/024; F05D 2220/764; F05D 2260/406; F05D 2260/40311
USPC ............................................. 475/344; 74/438
See application file for complete search history.

(56) References Cited

U.S. PATENT DOCUMENTS

| | | | |
|---|---|---|---|
| 4,276,785 A * | 7/1981 | Rouverol | F16H 55/0806 74/457 |
| 4,315,442 A * | 2/1982 | Cordner | F02C 7/268 123/179.1 |
| 4,734,590 A | 3/1988 | Fluegel | |
| 5,042,610 A | 8/1991 | Shiraishi et al. | |
| 2005/0020401 A1 | 1/2005 | Ando et al. | |
| 2010/0284835 A1 | 11/2010 | Allen et al. | |
| 2010/0327684 A1* | 12/2010 | Grosskopf | F16H 55/0806 310/83 |

OTHER PUBLICATIONS

European Search Report for EP Application No. 18213680.4 dated Mar. 26, 2019.

* cited by examiner

*Primary Examiner* — Roger L Pang
(74) *Attorney, Agent, or Firm* — Carlson, Gaskey & Olds, P.C.

(57) ABSTRACT

An output ring gear for use in an integrated drive generator has a gear body extending between a first end and a second end and having a disc extending radially outwardly. A boss extends from the disc toward the second end. There are outer gear teeth outwardly of an outer diameter of the disc. There are inner gear teeth inwardly of an inner surface of the disc. The outer and inner gear teeth have a unique gear tooth profile with roll angles A, B, C, and D. An integrated drive generator and a method are also disclosed.

3 Claims, 3 Drawing Sheets

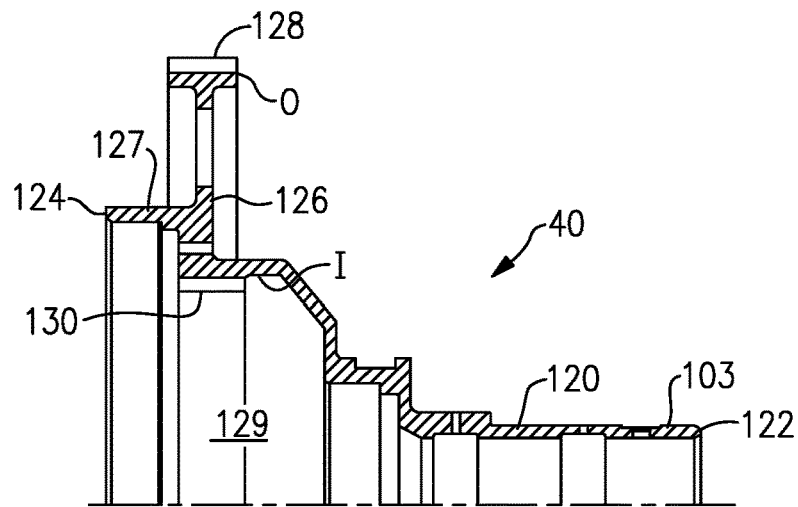
FIG.3A
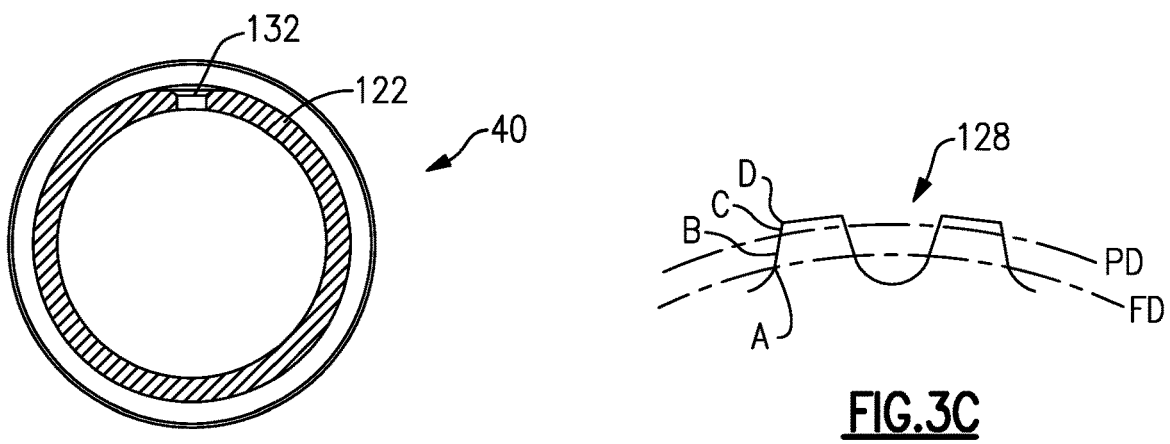
FIG.3B
FIG.3C
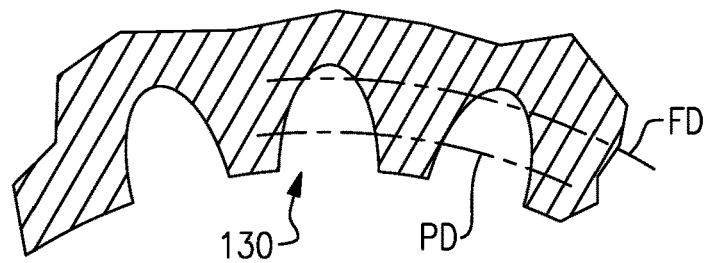
FIG.3D

OUTPUT RING GEAR FOR INTEGRATED DRIVE GENERATOR

BACKGROUND

This application relates to an output ring gear for an integrated drive generator.

Integrated drive generators are known and often utilized in aircraft. As known, a gas turbine engine on the aircraft provides a drive input into a generator input shaft. The generator typically includes a disconnect shaft that can transmit the input into a gear differential. The gear differential selectively drives a main generator through an output ring gear to provide electric power for various uses on the aircraft.

It is desirable that the generated power be of a desired constant frequency. However, the speed from the input shaft will vary during operation of the gas turbine engine. This would result in variable frequency.

Integrated drive generators are provided with speed trimming hydraulic units. Gears associated with the differential and, in particular, a ring gear portion, provide rotation from the differential back into the trimming unit. A carrier also rotates another portion of the trimming unit. The trimming unit is operable to result in the output speed of the differential being effectively constant, such that electric power of a desirable frequency is generated.

The generator is mounted between two housing portions and a seal plate is mounted between the two housing portions.

In addition, various accessory systems, such as various pumps, are driven by the output ring gear of the differential through an accessory drive gear. The accessory drive gear is connected to the output ring gear. Two such pumps are scavenge and charge pumps. A drive gear drives these pumps.

The output ring gear must successfully provide rotational input to the generator. There are challenges with regard to this ring gear.

SUMMARY

An output ring gear for use in an integrated drive generator has a gear body extending between a first end and a second end and having a disc extending radially outwardly. A boss extends from the disc toward the second end. There are outer gear teeth outwardly of an outer diameter of the disc. The outer gear teeth have a gear tooth profile with roll angles A, B, C, and D. The roll angle at A for the outer gear teeth is between 17.3 and 18.8 degrees. The roll angle at B for the outer gear teeth is between 18.3 and 19.8 degrees. The roll angle at C for the outer gear teeth is between 21.3 and 22.8 degrees. The roll angle at D for the outer gear teeth is between 22.2 and 23.7 degrees. There are inner gear teeth inwardly of an inner surface of the disc. The inner gear teeth have a gear tooth profile with roll angles A, B, C, and D. The roll angle at A for the inner gear teeth is between 31.6 and 33.1 degrees. The roll angle at B for the inner gear teeth is between 30.0 and 31.5 degrees. The roll angle at C for the inner gear teeth is between 25.4 and 26.9 degrees. The roll angle at D for the inner gear teeth is between 23.9 and 25.4 degrees.

In addition, an integrated drive generator is disclosed as is a method of replacing an output ring gear in an integrated drive generator.

These and other features may be best understood from the following drawings and specification.

BRIEF DESCRIPTION OF THE DRAWINGS

FIG. 3A shows an output ring gear.
FIG. 3B is an end view.
FIG. 3C shows a gear tooth profile.
FIG. 3D shows another gear tooth profile.

DETAILED DESCRIPTION

Figure 1:
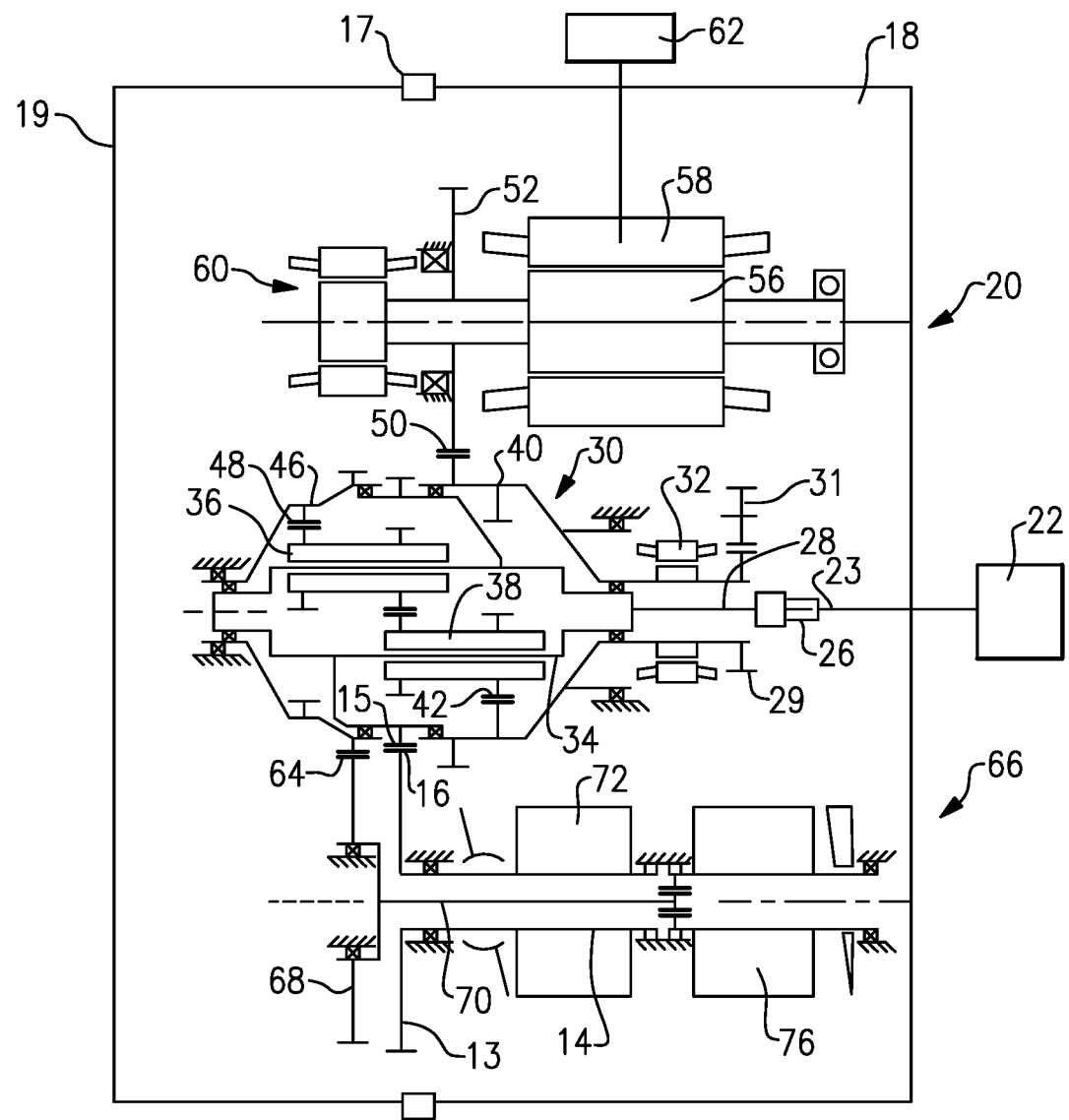
FIG. 1 schematically shows an integrated drive generator.

FIG. 1 shows an integrated drive generator 20. As shown, housing portions 18 and 19 surround the integrated drive generator and a seal plate 17 sits between the housing portions 18 and 19.

A gas turbine engine 22 may drive an input shaft 23 which selectively drives a disconnect assembly 26. The disconnect assembly 26, in turn, drives a carrier shaft 28, which drives a carrier in a gear differential 30.

As the carrier shaft 28 rotates, planet gears 36 and 38 are caused to rotate. Gears 38 have a gear interface 42 with a first ring gear portion 40. Gears 36 have a gear interface 48 with a second ring gear portion 46.

Ring gear portion 40 has a gear interface 50 with a main generator drive gear 52. When drive gear 52 is driven to rotate, it rotates a rotor 56 associated with a stator 58 of the main generator as well as an exciter rotor 60. Electric power is generated for a use 62, as known.

It is desirable that the frequency of the generated electric power be at a desired frequency. This requires the input speed to gear 52 to be relatively constant and at the desired speed. As such, the speed of the input shaft 23 is added to the speed of the speed trimmer 66 to result in a constant input speed to gear 52.

A gear 15 that is part of the carrier has a gear interface 16 with a gear 13 driving a shaft 14 also within the speed trimmer.

As known, the speed trimmer 66 includes a variable unit 72 and a fixed unit 76. The units 72 and 76 may each be provided with a plurality of pistons and a swash plate arrangement. If the input speed of the gear 13 is too high, the speed of the gear 52 will also be too high, and hence, the speed trimmer 66 acts to lower the speed of the trim gear 46 which will drop the speed of gear 52. On the other hand, if the input speed is too low, the speed trimmer will increase the trim gear speed and he speed seen by gear 52 will increase.

In essence, the variable unit 72 receives an input through gear 13 that is proportional to the speed of the input shaft 23. The variable unit 72 also receives a control input from a control monitoring the speed of the generator rotor 56. The position of the swash plate in the variable unit 72 is changed to in turn change the speed and direction of the fixed unit 76. The fixed unit 76 can change the speed, and direction of rotation of the shaft 70, and this then provides control back through the trim ring gear 46 to change the speed reaching the generator. In this manner, the speed trimmer 66 results in the frequency generated by the generator being closer to constant, and at the desired frequency.

A permanent magnet generator 32 rotates with the ring gear 40.

An accessory drive shaft 29 rotates with the ring gear 40 and drives a plurality of accessory gears 31.

The operation of the integrated drive generator 20 is generally as known in the art. Ring gear 40 is unique, as discussed below. A worker of ordinary skill would recognize that the desired frequency and speed at use 62 would dictate a number of design functions.

Figure 2:
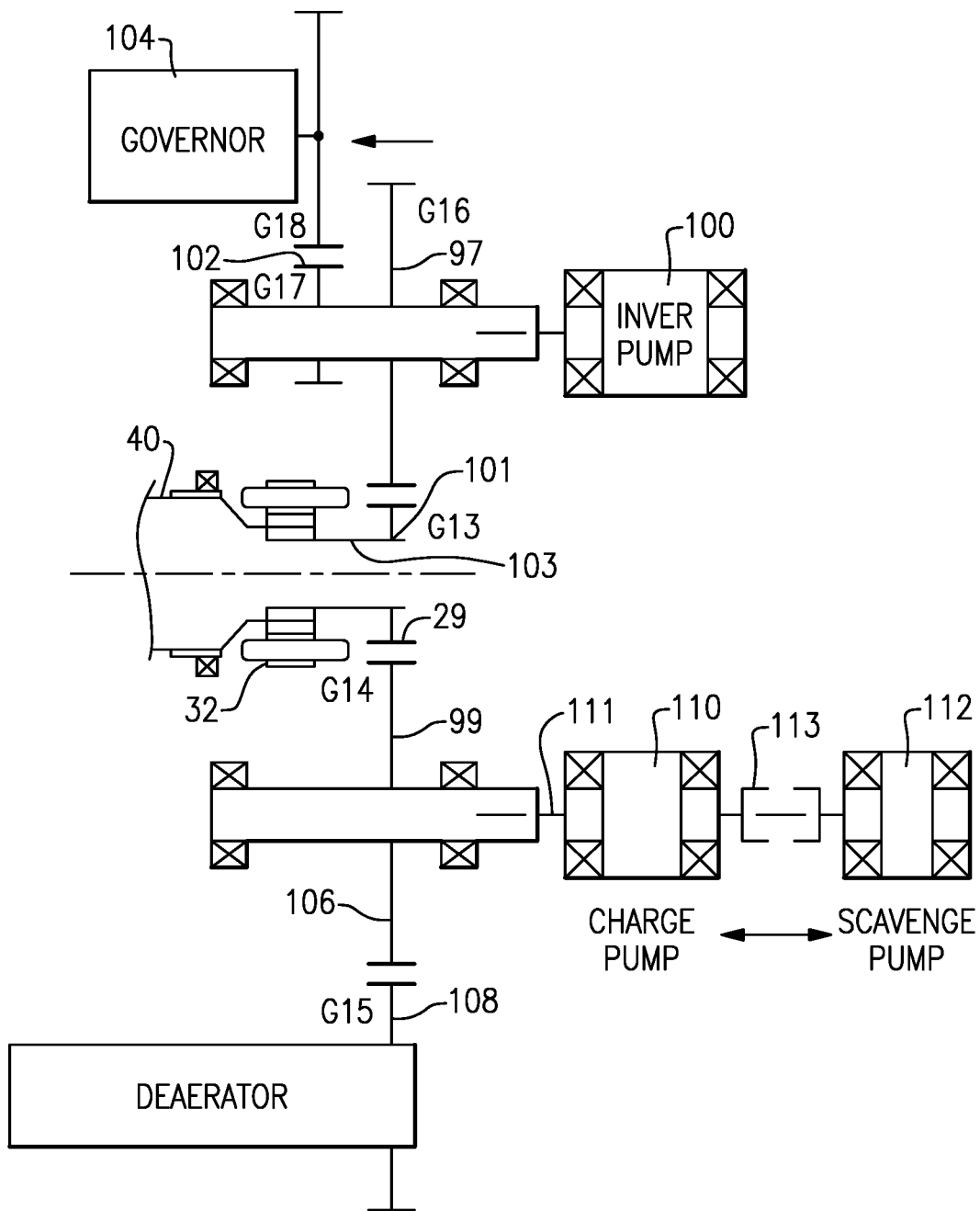
FIG. 2 shows an accessory gear drive train.

FIG. 2 shows the accessory drive gear 29. The accessory drive gear 29 drives a pair of gears 97 and 99. Accessory drive gear 29 is keyed at 101 to a shaft 103 on a ring gear 40. These gears were shown schematically as gear 31 in FIG. 1. One gear 97 drives a second gear 102, which, in turn, drives the governor 104. The gear 97 also drives an inversion pump 100.

The second gear 99 drives a deaerator through gear 108, as well as a charge pump 110 and a scavenge pump 112. For purposes of this application, this gear 99 will be called a scavenge/charge drive gear A shaft 111 is shown schematically connecting drive gear 99 to pump 110, and a shaft 113 connecting pump 110 to pump 112. Shaft 111 is driven by spline teeth in the drive gear 99.

FIG. 3A shows the output ring gear 40 having a body 120 extending from a first end 122 to a second end 124. An enlarged disc 126 extends outwardly of a boss 127. The boss extends between the disc 126 and the second end 124. Disc 126 has an outer diameter O receiving drive gear teeth 128. Teeth 128 drive gear 52. The boss 127 has an inner surface I defining a bore 129. Inner gear teeth 130 are formed inwardly of inner surface I.

The inner gear teeth 130 engage a planet gear 38 at gear interface 42 (see FIG. 1).

FIG. 3B shows an end view from first end 122. A keyway 132 is utilized to connect the output ring gear to the accessory drive gear 29.

FIG. 3C shows a profile of outer gear teeth 128. The gear teeth have a pitch diameter PD. In one embodiment, the pitch diameter is 7.10 inches (18.03 centimeters). This and all dimensions in this application have a tolerance of +/- the 0.01 inch (0.025 centimeters).

A maximum form diameter FD is 6.99 inches (17.75 centimeters).

As known in the gear tooth art, the profile of the gear teeth is defined by roll angles at points A, B, C, and D. It should be understood specific roll angles of this disclosed gear are novel. All that is known in the art is the specific location of the points A-D. In a disclosed embodiment, the roll angle at A was 18.0 degrees and in embodiments between 17.3 and 18.8 degrees. The roll angle at B was 19.0 degrees and in embodiments between 18.3 and 19.8 degrees. The roll angle at C was 22.0 degrees and in embodiments between 21.3 and 22.8 degrees. The roll angle at D was 23.0 degrees and in embodiments between 22.2 and 23.7 degrees.

FIG. 3D shows a profile of inner gear teeth 130. The gear teeth have a pitch diameter PD. In one embodiment, the pitch diameter is 3.50 inches (8.89 centimeters).

A maximum form diameter FD is 3.64 inches (9.25 centimeters).

At a disclosed embodiment, the roll angle at A was 32.3 degrees and in embodiments between 31.6 and 33.1 degrees. The roll angle at B was 30.8 degrees and in embodiments between 30.0 and 31.5 degrees. The roll angle at C was 26.1 degrees and in embodiments between 25.4 and 26.9 degrees. The roll angle at D was 24.6 degrees and in embodiments between 23.9 and 25.4 degrees.

For both teeth 128 and 130, the roll angle at A is applied at the form diameter FD. The roll angle at B is 20 percent away from roll angle A and between roll angle A and roll angle D. The roll angle at C is 80 percent away from roll angle A and between roll angle A and roll angle D. The roll angle at D is at the outer diameter of the gear tooth.

In embodiments, there are 142 outer gear teeth 128 and 70 inner gear teeth 130.

A method of replacing an outer ring gear includes removing an existing output ring gear from an integrated drive generator. The integrated drive generator has an input shaft and a gear differential including a carrier shaft. The gear differential includes the existing output ring gear connected to a generator. The existing output ring gear is connected to an accessory drive gear. The accessory drive gear is connected to drive a pump. The method also includes the step of replacing the existing output ring gear with a replacement output ring gear. The replacement output ring gear includes a gear body extending between a first end and a second end and having a disc extending radially outwardly. A boss extends from the disc toward the second end. Outer gear teeth are formed outwardly of an outer diameter of the disc. The outer gear teeth have a gear tooth profile with roll angles A, B, C, and D. The roll angle at A for the outer gear teeth is between 17.3 and 18.8 degrees. The roll angle at B for the outer gear teeth is between 18.3 and 19.8 degrees. The roll angle at C for the outer gear teeth is between 21.3 and 22.8 degrees. The roll angle at D for the outer gear teeth is between 22.2 and 23.7 degrees. There are inner gear teeth inwardly of an inner surface of the disc. The inner gear teeth have a gear tooth profile with roll angles A, B, C, and D. The roll angle at A for the inner gear teeth is between 31.6 and 33.1 degrees. The roll angle at B for the inner gear teeth is between 30.0 and 31.5 degrees. The roll angle at C for the inner gear teeth is between 25.4 and 26.9 degrees. The roll angle at D for the inner gear teeth is between 23.9 and 25.4 degrees.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. An output ring gear for use in an integrated drive generator comprising:
  a gear body extending between a first end and a second end and having a disc extending radially outwardly, and a boss extending from said disc toward said second end;
  there being outer gear teeth outwardly of an outer diameter of said disc, said outer gear teeth having a gear tooth profile with roll angles A, B, C, and D, and the roll angle at A for said outer gear teeth being between 17.3 and 18.8 degrees, the roll angle at B for said outer gear teeth being between 18.3 and 19.8 degrees, the roll angle at C for said outer gear teeth being between 21.3 and 22.8 degrees, and the roll angle at D for said outer gear teeth being between 22.2 and 23.7 degrees;
  inner gear teeth formed inwardly of an inner surface of said disc, said inner gear teeth having a gear tooth profile with roll angles A, B, C, and D, and the roll angle at A for said inner gear teeth being between 31.6 and 33.1 degrees, the roll angle at B for said inner gear teeth being between 30.0 and 31.5 degrees, the roll angle at C for said inner gear teeth being between 25.4 and 26.9 degrees, and the roll angle at D for said inner gear teeth being between 23.9 and 25.4 degrees;
  wherein said outer gear teeth have a pitch diameter of 7.10 inches (18.03 centimeters) with a tolerance of +/−0.01 inch (0.025 centimeters) and said inner gear teeth have a pitch diameter of 3.50 inches (8.89 centimeters) with a tolerance of +/−0.01 inch (0.025 centimeters);

wherein there are 142 of said outer gear teeth and 70 of said inner gear teeth; and wherein said outer gear teeth have a maximum form diameter of 6.99 inches (17.75 centimeters) and said inner gear teeth have a maximum form diameter of 3.64 inches (9.25 centimeters) with a tolerance of +/−0.01 inch (0.025 centimeters).

2. An integrated drive generator comprising:

an input shaft, a gear differential including a carrier shaft connected to said input shaft and including an output ring gear connected to a generator;

said output ring gear also connected to an accessory drive gear, said accessory drive gear connected to at least one pump drive gear;

said output ring gear comprising a gear body extending between a first end and a second end and having a disc extending radially outwardly, and a boss extending from said disc toward said second end, there being outer gear teeth outwardly of an outer diameter of said disc, said outer gear teeth having a gear tooth profile with roll angles A, B, C, and D, and the roll angle at A for said outer gear teeth being between 17.3 and 18.8 degrees, the roll angle at B for said outer gear teeth being between 18.3 and 19.8 degrees, the roll angle at C for said outer gear teeth being between 21.3 and 22.8 degrees;

inner gear teeth formed inwardly of an inner surface of said disc, said inner gear teeth having a gear tooth profile with roll angles A, B, C, and D, and the roll angle at A for said inner gear teeth being between 31.6 and 33.1 degrees, the roll angle at B for said inner gear teeth being between 30.0 and 31.5 degrees, the roll angle at C for said inner gear teeth being between 25.4 and 26.9 degrees, and the roll angle at D for said inner gear teeth being between 23.9 and 25.4 degrees;

said outer gear teeth engaged to teeth on a generator drive gear, said inner gear teeth engaged to teeth on a planet gear in said gear differential;

wherein said outer gear teeth have a pitch diameter of 7.10 inches (18.03 centimeters with a tolerance of +/−0.01 inch (0.025 centimeters) and said inner rear teeth have a pitch diameter of 3.50 inches (8.89 centimeters) with a tolerance of +/− 0.01 inch (0.025 centimeters);

wherein there are 142 of said outer gear teeth and 70 of said inner gear teeth; and wherein said outer gear teeth have a maximum form diameter of 6.99 inches (17.75 centimeters) and said inner gear teeth have a maximum form diameter of 3.64 inches (9.25 centimeters) with a tolerance of +/−0.01 inch (0.025 centimeters).

3. A method of replacing an output ring gear comprising the steps of:

a) removing an existing output ring gear from an integrated drive generator having an input shaft, a gear differential including a carrier shaft and the gear differential including said existing output ring gear connected to a generator, said output ring gear also connected to an accessory drive gear, said accessory drive gear being connected to drive a pump;

b) replacing the existing output ring gear with a replacement output ring gear including a gear body extending between a first end and a second end and having a disc extending radially outwardly, and a boss extending from said disc toward said second end, there being outer gear teeth outwardly of an outer diameter of said disc, said outer gear teeth having a gear tooth profile with roll angles A, B, C, and D, and the roll angle at A for said outer gear teeth being between 17.3 and 18.8 degrees, the roll angle at B for said outer gear teeth being between 18.3 and 19.8 degrees, the roll angle at C for said outer gear teeth being between 21.3 and 22.8 degrees, and the roll angle at D for said outer gear teeth being between 22.2 and 23.7 degrees, inner gear teeth formed inwardly of an inner surface of said disc, said inner gear teeth having a gear tooth profile with roll angles A, B, C, and D, and the roll angle at A for said inner gear teeth being between 31.6 and 33.1 degrees, the roll angle at B for said inner gear teeth being between 30.0 and 31.5 degrees, the roll angle at C for said inner gear teeth being between 25.4 and 26.9 degrees, and the roll angle at D for said inner gear teeth being between 23.9 and 25.4 degrees;

wherein said outer gear teeth have a pitch diameter of 7.10 inches (18.03 centimeters) with a tolerance of +/−0.01 inch (0.025 centimeters) and said inner gear teeth have a pitch diameter of 3.50 inches (8.89 centimeters) with a tolerance of +/−0.01 inch (0.025 centimeters);

wherein there are 142 of said outer gear teeth and 70 of said inner gear teeth; and wherein said outer gear teeth have a maximum form diameter of 6.99 inches (17.75 centimeters) and said inner gear teeth have a maximum form diameter of 3.64 inches (9.25 centimeters) with a tolerance of +/−0.01 inch (0.025 centimeters).

\* \* \* \* \*